US011598692B2

(12) United States Patent
Nakamura et al.

(10) Patent No.: US 11,598,692 B2
(45) Date of Patent: Mar. 7, 2023

(54) OPTICAL PULSE TESTING METHOD AND OPTICAL PULSE TESTING DEVICE

(71) Applicant: NIPPON TELEGRAPH AND TELEPHONE CORPORATION, Tokyo (JP)

(72) Inventors: Atsushi Nakamura, Musashino (JP); Keiji Okamoto, Musashino (JP); Hiroyuki Oshida, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 93 days.

(21) Appl. No.: 17/413,880

(22) PCT Filed: Dec. 3, 2019

(86) PCT No.: PCT/JP2019/047195
§ 371 (c)(1),
(2) Date: Jun. 14, 2021

(87) PCT Pub. No.: WO2020/129615
PCT Pub. Date: Jun. 25, 2020

(65) Prior Publication Data
US 2022/0065744 A1    Mar. 3, 2022

(30) Foreign Application Priority Data
Dec. 17, 2018  (JP) .............................. JP2018-235878

(51) Int. Cl.
*G01M 11/00* (2006.01)
(52) U.S. Cl.
CPC ........ *G01M 11/3154* (2013.01); *G01M 11/31* (2013.01); *G01M 11/3136* (2013.01); *G01M 11/3145* (2013.01)

(58) Field of Classification Search
CPC ......... G01M 11/3136; G01M 11/3145; G01M 11/3154
See application file for complete search history.

(56) References Cited

U.S. PATENT DOCUMENTS

2022/0065744 A1*  3/2022  Nakamura ............. G01M 11/31
2022/0244137 A1*  8/2022  Nakamura ......... G01M 11/3145

OTHER PUBLICATIONS

Masataka Nakazawa et al., Measurement of mode coupling distribution along a few-mode fiber using a synchronous multi-channel OTDR, Optics Express, vol. 22, No. 25, 2014, pp. 31299-31309.
(Continued)

*Primary Examiner* — Michelle M Iacoletti
*Assistant Examiner* — Alima Diawara Soumare

(57) ABSTRACT

An object is to provide an optical pulse test method and an optical pulse test device with which it is possible to measure transmission losses of a basic mode and a first higher-order mode at a connection point at which two-mode optical fibers are connected in series, without switching the mode of input test light.

An optical pulse test device according to the present invention inputs a test optical pulse in a basic mode (or a first higher-order mode) from one end of an optical fiber under test, the test optical pulse having such a wavelength that the test optical pulse can propagate in the basic mode and the first higher-order mode, measures intensity distributions of a basic mode component and a first higher-order mode component of return light of the test optical pulse relative to the distance from the one end, finds, from the intensity distributions, losses of the basic mode component and the first higher-order mode component of the return light at a desired connection point of the optical fiber under test, and calculates transmission losses of the basic mode and the first higher-order mode at the connection point based on expressions (8) (or expressions (9)).

6 Claims, 4 Drawing Sheets

(56) References Cited

OTHER PUBLICATIONS

Atsushi Nakamura et al., Reduction of modal evolution fluctuation in 2-LP mode optical time domain reflectometry, Optics Express, vol. 25, No. 17, 2017, pp. 20727-20736.

* cited by examiner

OPTICAL PULSE TESTING METHOD AND OPTICAL PULSE TESTING DEVICE

CROSS-REFERENCE TO RELATED APPLICATIONS

This application is a 371 U.S. National Phase of International Application No. PCT/JP2019/047195 filed on Dec. 3, 2019, which claims priority to Japanese Application No. 2018-235878 filed on Dec. 17, 2018. The entire disclosures of the above applications are incorporated herein by reference.

TECHNICAL FIELD

The present disclosure relates to an optical pulse test method and an optical pulse test device for measuring connection loss of an optical fiber that is obtained by connecting two-mode optical fibers in series.

BACKGROUND ART

The amount of traffic in optical fiber networks is increasing year by year following an increase of large-volume contents represented by moving images and games and the popularization of smartphones. On the other hand, the transmission capacity of single-mode fibers that are currently used as transmission media is approaching the limit. As a technology for dealing with a future increase in traffic, mode multiplex transmission that uses few-mode fibers is attracting attention. To implement mode multiplex transmission, a technology for measuring loss characteristics of each mode used for transmission after constructing an optical transmission path using few-mode fibers is essential.

As a method for testing loss after constructing a transmission path, optical time domain reflectometry (hereinafter referred to as "OTDR") is famous. The OTDR refers to a method and a device that input pulsed test light to a fiber under test (hereinafter referred to as a "FUT") and acquire distribution data (a backscattered waveform) based on the intensity of backscattered light of Rayleigh scattering light and Fresnel reflection light derived from a test optical pulse that propagates through the optical fiber and a round trip time. NPL 1 discloses OTDR that separately measures a basic mode and a first higher-order mode that are included in backscattered light, as OTDR for testing two-mode fibers. Information regarding loss in the optical fiber can be acquired from backscattered waveforms of mode components.

CITATION LIST

Non Patent Literature

[NPL 1] M. Nakazawa et. al., "Measurement of mode coupling distribution along a few-mode fiber using a synchronous multi-channel OTDR," Opt. Express, vol. 22, no. 25, pp. 31299-31309, 2014.
[NPL 2] A. Nakamura et. al., "Reduction of modal evolution fluctuation in 2-LP mode optical time domain reflectometry," Opt. Express, vol. 25, no. 17, pp. 20727-20736, 2017.

SUMMARY OF THE INVENTION

Technical Problem

To acquire a loss of the basic mode and a loss of the first higher-order mode at a connection point of two-mode fibers using the test method described in NPL 1, it is necessary to perform measurement a total of two times, that is, measurement in which test light is input in the basic mode and measurement in which test light is input in the first higher-order mode. To switch the mode of input between these two types of measurement, it is necessary to manually switch an optical connector or include an optical switch in the device. That is, there is a problem in that manual operations required for the measurement are troublesome and the configuration of the measurement device is complex.

The present invention was made in view of the above circumstances, and it is an object of the present invention to provide an optical pulse test method and an optical pulse test device with which it is possible to measure transmission losses of a basic mode and a first higher-order mode at a connection point at which two-mode optical fibers are connected in series, without switching the mode of input test light.

Means for Solving the Problem

To achieve the above-described object, an optical pulse test method and an optical pulse test device according to the present invention only use a test optical pulse of either one of a basic mode and a first higher-order mode, and calculate transmission connection losses of both of the basic mode and the first higher-order mode by performing arithmetic processing on losses that occur in backscattered waveforms of a basic mode component and a first higher-order mode component.

Specifically, a first optical pulse test method according to the present invention includes: a first input procedure of inputting a test optical pulse in a basic mode from one end of an optical fiber under test that is obtained by connecting optical fibers of the same type in series, the test optical pulse having such a wavelength that the test optical pulse can propagate through the optical fiber under test in the basic mode and a first higher-order mode; first measurement procedure of receiving return light that is generated by the test optical pulse input in the first input procedure and measuring intensity distributions of a basic mode component and a first higher-order mode component of the return light relative to the distance from the one end; a first loss calculation procedure of calculating a loss L1 of the basic mode component and a loss L2 of the first higher-order mode component of the return light at a connection point at which the optical fibers of the same type constituting the optical fiber under test are connected in series, from the intensity distributions measured in the first measurement procedure; and a first computation procedure of computing a transmission loss L01 of the basic mode at the connection point and a transmission loss L11 of the first higher-order mode at the connection point by substituting the losses L1 and L2 calculated in the first loss calculation procedure into first expressions that are simultaneous equations obtained from expressions that express the losses L1 and L2, the transmission loss L01 of the basic mode, and the transmission loss L11 of the first higher-order mode by using efficiencies of coupling between the modes at the connection point.

Also, a second optical pulse test method according to the present invention includes: a second input procedure of inputting a test optical pulse in a first higher-order mode from one end of an optical fiber under test that is obtained by connecting optical fibers of the same type in series, the test optical pulse having such a wavelength that the test optical pulse can propagate through the optical fiber under test in a basic mode and the first higher-order mode; a second measurement procedure of receiving return light that is generated by the test optical pulse input in the second input procedure and measuring intensity distributions of a basic mode component and a first higher-order mode component of the return light relative to the distance from the one end; a second loss calculation procedure of calculating a loss L3 of the basic mode component and a loss L4 of the first higher-order mode component of the return light at a connection point at which the optical fibers of the same type constituting the optical fiber under test are connected in series, from the intensity distributions measured in the second measurement procedure; and a second computation procedure of computing a transmission loss L01 of the basic mode at the connection point and a transmission loss L11 of the first higher-order mode at the connection point by substituting the losses L3 and L4 calculated in the second loss calculation procedure into second expressions that are simultaneous equations obtained from expressions that express the losses L3 and L4, the transmission loss L01 of the basic mode, and the transmission loss L11 of the first higher-order mode by using efficiencies of coupling between the modes at the connection point.

Also, a first optical pulse test device according to the present invention includes: first input means for inputting a test optical pulse in a basic mode from one end of an optical fiber under test that is obtained by connecting optical fibers of the same type in series, the test optical pulse having such a wavelength that the test optical pulse can propagate through the optical fiber under test in the basic mode and a first higher-order mode; first measurement means for receiving return light that is generated by the test optical pulse input by the first input means and measuring intensity distributions of a basic mode component and a first higher-order mode component of the return light relative to the distance from the one end; first loss calculation means for calculating a loss L1 of the basic mode component and a loss L2 of the first higher-order mode component of the return light at a connection point at which the optical fibers of the same type constituting the optical fiber under test are connected in series, from the intensity distributions measured by the first measurement means; and first computation means for computing a transmission loss L01 of the basic mode at the connection point and a transmission loss L11 of the first higher-order mode at the connection point by substituting the losses L1 and L2 calculated by the second loss calculation means into first expressions that are simultaneous equations obtained from expressions that express the losses L1 and L2, the transmission loss L01 of the basic mode, and the transmission loss L11 of the first higher-order mode by using efficiencies of coupling between the modes at the connection point.

Also, a second optical pulse test device according to the present invention includes: second input means for inputting a test optical pulse in a first higher-order mode from one end of an optical fiber under test that is obtained by connecting optical fibers of the same type in series, the test optical pulse having such a wavelength that the test optical pulse can propagate through the optical fiber under test in a basic mode and the first higher-order mode; second measurement means for receiving return light that is generated by the test optical pulse input by the second input means and measuring intensity distributions of a basic mode component and a first higher-order mode component of the return light relative to the distance from the one end; second loss calculation means for calculating a loss L3 of the basic mode component and a loss L4 of the first higher-order mode component of the return light at a connection point at which the optical fibers of the same type constituting the optical fiber under test are connected in series, from the intensity distributions measured by the second measurement means; and second computation means for computing a transmission loss L01 of the basic mode at the connection point and a transmission loss L11 of the first higher-order mode at the connection point by substituting the losses L3 and L4 calculated by the first loss calculation means into second expressions that are simultaneous equations obtained from expressions that express the losses L3 and L4, the transmission loss L01 of the basic mode, and the transmission loss L11 of the first higher-order mode by using efficiencies of coupling between the modes at the connection point.

Here, the losses L1 and L2, the transmission loss L01 of the basic mode, and the transmission loss L11 of the first higher-order mode are expressed in decibels, and expressions (C1) are used as the first expressions $$L_{01} = \frac{L_1}{2} \qquad (C1)$$

$$L_{11} = L_2 - \frac{L_1}{2}.$$

Also, the losses L3 and L4, the transmission loss L01 of the basic mode, and the transmission loss L11 of the first higher-order mode are expressed in decibels, and expressions (C2) are used as the second expressions $$L_{11} = \frac{L_4}{2} \qquad (C2)$$

$$L_{01} = L_3 - \frac{L_4}{2}.$$

Effects of the Invention

The present invention can provide an optical pulse test method and an optical pulse test device with which it is possible to measure transmission losses of a basic mode and a first higher-order mode at a connection point at which two-mode optical fibers are connected in series, without switching the mode of input test light.

DESCRIPTION OF EMBODIMENTS

An embodiment of the present invention will be described with reference to the accompanying drawings. The following embodiment is exemplary implementation of the present invention and the present invention is not limited to the following embodiment. Note that in the present specification and the drawings, the same constitutional elements are denoted with the same reference signs.

Figure 1:
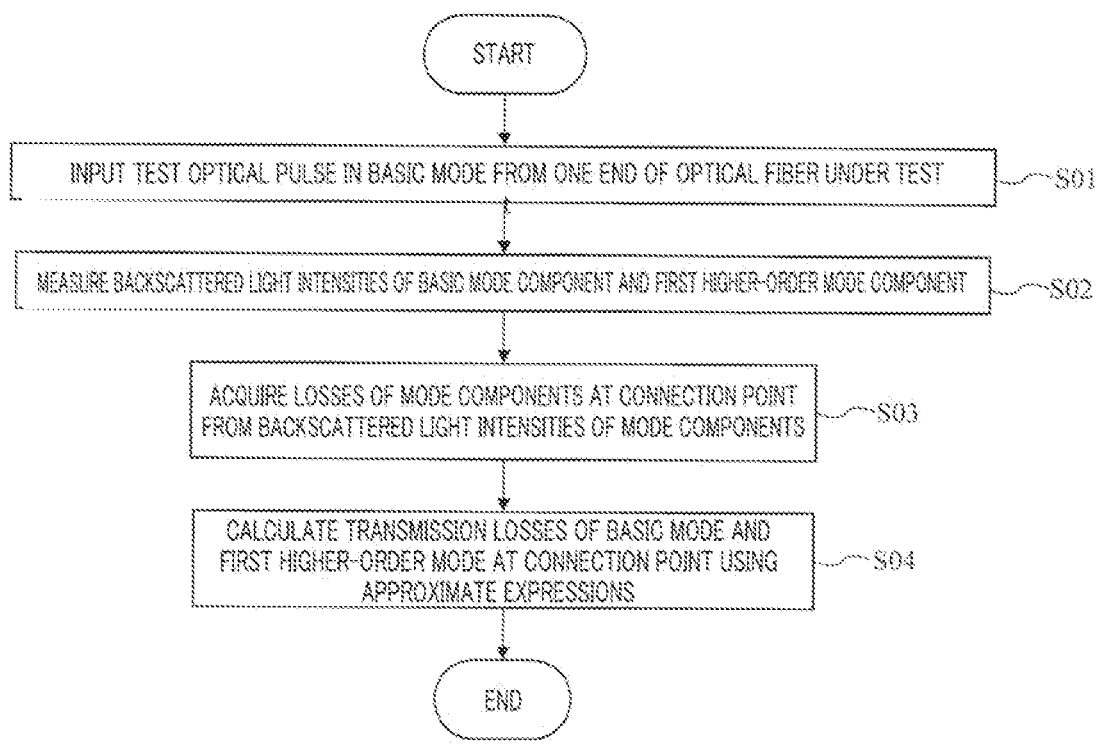
FIG. 1 is a diagram showing a first optical pulse test method according to the present invention.

FIG. 1 is a process diagram showing a first optical pulse test method of the present embodiment. In this optical pulse test method, a first input procedure S01, a first measurement procedure S02, a first loss calculation procedure S03, and a first computation procedure S04 are performed. In the first input procedure S01, a test optical pulse is input in a basic mode from one end of an optical fiber under test that is obtained by connecting optical fibers of the same type in series, the test optical pulse having such a wavelength that the test optical pulse can propagate through the optical fiber under test in the basic mode and a first higher-order mode. In the first measurement procedure S02, return light that is generated by the test optical pulse input in the first input procedure S01 is received and intensity distributions relative to the distance from the one end are measured with respect to a basic mode component and a first higher-order mode component of the return light.

In the first loss calculation procedure S03, a loss L1 of the basic mode component and a loss L2 of the first higher-order mode component of the return light at a connection point at which the optical fibers of the same type constituting the optical fiber under test are connected in series are calculated from the intensity distributions measured in the first measurement procedure S02.

In the first computation procedure S04, a transmission loss L01 of the basic mode at the connection point and a transmission loss L11 of the first higher-order mode at the connection point are computed by substituting the losses L1 and L2 calculated in the first loss calculation procedure S03 into expressions (8) that are simultaneous equations obtained from expressions that express the losses L1 and L2, the transmission loss L01 of the basic mode, and the transmission loss L11 of the first higher-order mode by using efficiencies of coupling between the modes at the connection point.

Figure 2:
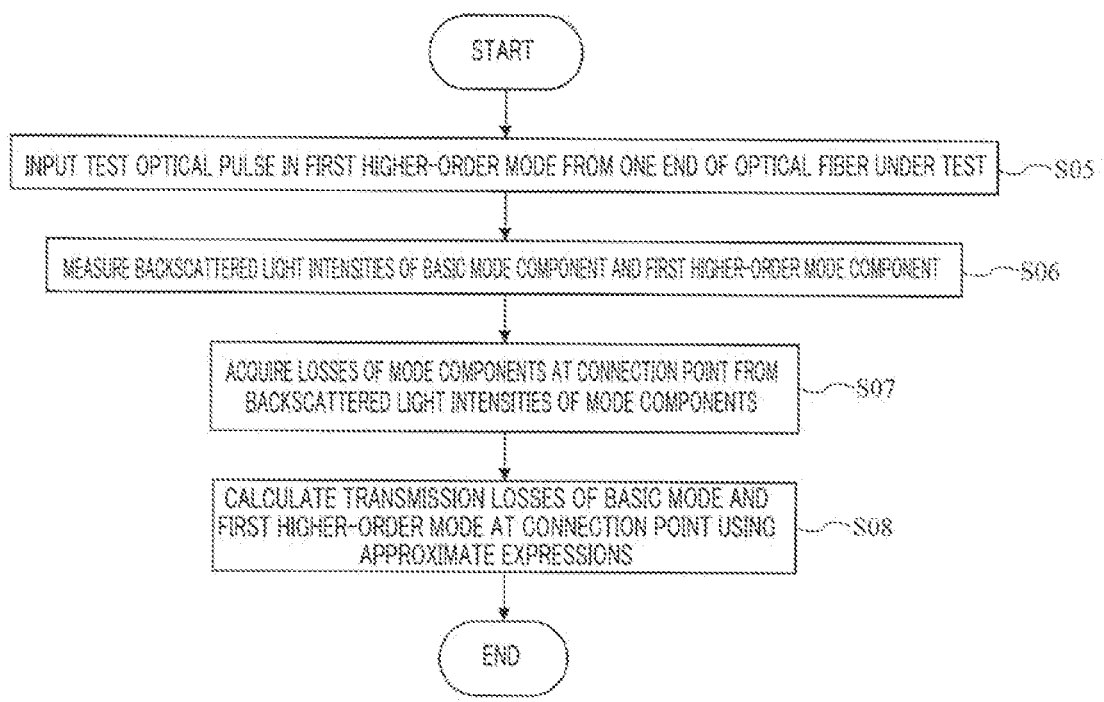
FIG. 2 is a diagram showing a second optical pulse test method according to the present invention.

FIG. 2 is a process diagram showing a second optical pulse test method of the present embodiment. In this optical pulse test method, a second input procedure S05, a second measurement procedure S06, a second loss calculation procedure S07, and a second computation procedure S08 are performed. In the second input procedure S05, a test optical pulse is input in the first higher-order mode from one end of an optical fiber under test that is obtained by connecting optical fibers of the same type in series, the test optical pulse having such a wavelength that the test optical pulse can propagate through the optical fiber under test in the basic mode and the first higher-order mode.

In the second measurement procedure S06, return light that is generated by the test optical pulse input in the second input procedure S05 is received and intensity distributions relative to the distance from the one end are measured with respect to a basic mode component and a first higher-order mode component of the return light.

In the second loss calculation procedure S07, a loss L3 of the basic mode component and a loss L4 of the first higher-order mode component of the return light at a connection point at which the optical fibers of the same type constituting the optical fiber under test are connected in series are calculated from the intensity distributions measured in the second measurement procedure S06.

In the second computation procedure S08, a transmission loss L01 of the basic mode at the connection point and a transmission loss L11 of the first higher-order mode at the connection point are computed by substituting the losses L3 and L4 calculated in the second loss calculation procedure S07 into expressions (9) that are simultaneous equations obtained from expressions that express the losses L3 and L4, the transmission loss L01 of the basic mode, and the transmission loss L11 of the first higher-order mode by using efficiencies of coupling between the modes at the connection point.

In the first input procedure S01, the following steps are performed:
a generation step of generating a test optical pulse having such a wavelength that the test optical pulse can propagate through the optical fiber under test in the basic mode and the first higher-order mode; and
a first input step of inputting the test optical pulse generated in the generation step to one end of the optical fiber under test in the basic mode.

In the first measurement procedure S02, the following steps are performed:
a mode demultiplexing step of separating return light of the test optical pulse, which has been input to the one end of the optical fiber under test in the first input step, into the basic mode and the first higher-order mode; and
a first light intensity acquisition step of performing photoelectric conversion on mode components of the return light separated in the mode demultiplexing step and acquiring intensity distributions of the mode components of the return light relative to the distance from the one end of the optical fiber under test.

That is, in the first input procedure S01 and the first measurement procedure S02, backscattered light intensity distributions of the basic mode and the first higher-order mode are measured from the one end of the optical fiber under test by using backscattered light measurement technologies as those described in NPL 1 and NPL 2.

In the first loss calculation procedure S03, a first loss calculation step is performed in which losses that occur in the mode components of the return light at a connection point of the optical fiber under test are calculated from the intensity distributions of the mode components of the return light acquired in the first light intensity acquisition step.

In the first computation procedure S04, a first computation step is performed in which transmission losses of the basic mode and the first higher-order mode at the connection point are computed using approximate expressions (expressions (8)) from the losses acquired in the first loss calculation step. Details of the computation of the transmission losses of the basic mode and the first higher-order mode at the connection point will be described later.

In the second input procedure S05, the following steps are performed:
a generation step of generating a test optical pulse having such a wavelength that the test optical pulse can propagate through the optical fiber under test in the basic mode and the first higher-order mode; and
a second input step of inputting the test optical pulse generated in the generation step to one end of the optical fiber under test in the first higher-order mode.

In the second measurement procedure S06, the following steps are performed:
a mode demultiplexing step of separating return light of the test optical pulse, which has been input to the one end of the optical fiber under test in the second input step, into the basic mode and the first higher-order mode; and
a second light intensity acquisition step of performing photoelectric conversion on mode components of the return light separated in the mode demultiplexing step and acquiring intensity distributions of the mode components of the return light relative to the distance from the one end of the optical fiber under test.

That is, in the second input procedure S05 and the second measurement procedure S06, backscattered light intensity distributions of the basic mode and the first higher-order mode are measured from the one end of the optical fiber under test by using backscattered light measurement technologies as those described in NPL 1 and NPL 2.

In the first loss calculation procedure S07, a second loss calculation step is performed in which losses that occur in the mode components of the return light at a connection point of the optical fiber under test are calculated from the intensity distributions of the mode components of the return light acquired in the second light intensity acquisition step.

In the second computation procedure S08, a second computation step is performed in which transmission losses of the basic mode and the first higher-order mode at the connection point are computed using approximate expressions (expressions (9)) from the losses acquired in the second loss calculation step. Details of the computation of the transmission losses of the basic mode and the first higher-order mode at the connection point will be described later.

Figure 3:
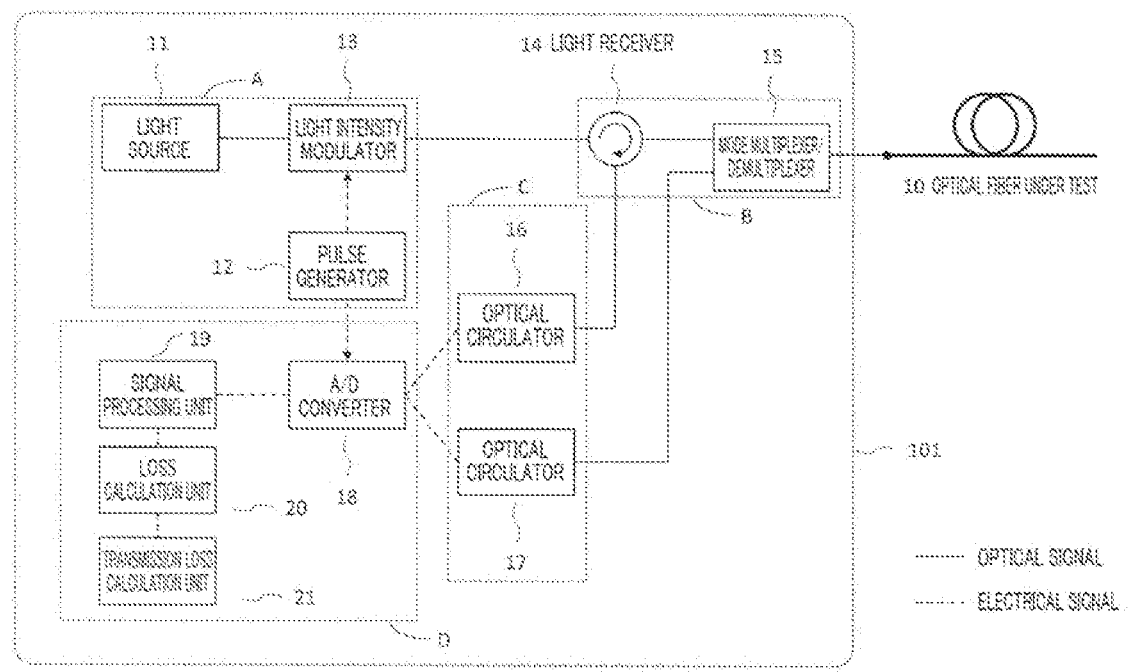
FIG. 3 is a diagram showing an optical pulse test device according to the present invention.
Figure 4:
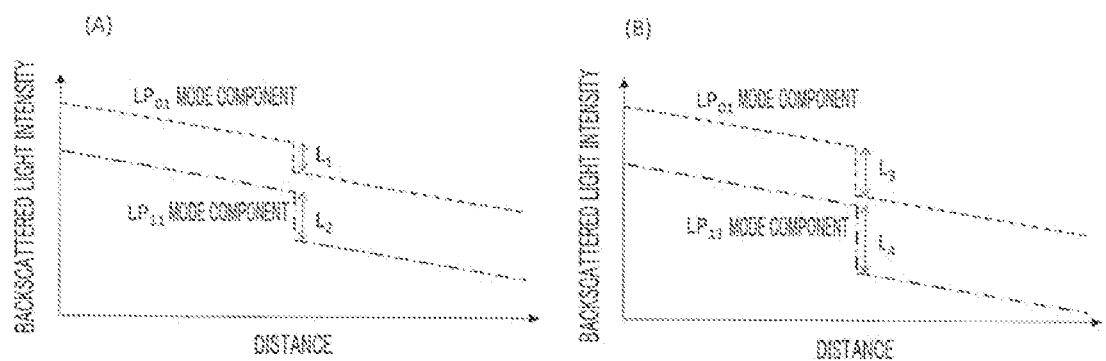
FIG. 4 is a diagram showing losses that occur in backscattered waveforms.

FIG. 3 is a diagram showing an exemplary configuration of an optical pulse test device 101 with which the first and second optical pulse test methods are performed. In a case in which the first optical pulse test method shown in FIG. 1 is performed, the optical pulse test device 101 includes first input means, first measurement means, first loss calculation means, and first computation means.

The first input means inputs a test optical pulse in the basic mode from one end of an optical fiber 10 under test that is obtained by connecting optical fibers of the same type in series, the test optical pulse having such a wavelength that the test optical pulse can propagate through the optical fiber 10 under test in the basic mode and the first higher-order mode.

The first measurement means receives return light that is generated by the test optical pulse input by the first input means, and measures intensity distributions relative to the distance from the one end with respect to a basic mode component and a first higher-order mode component of the return light.

The first loss calculation means calculates a loss L1 of the basic mode component and a loss L2 of the first higher-order mode component of the return light at a connection point at which the optical fibers of the same type constituting the optical fiber 10 under test are connected in series, from the intensity distributions measured by the first measurement means.

The first computation means computes a transmission loss L01 of the basic mode at the connection point and a transmission loss L11 of the first higher-order mode at the connection point by substituting the losses L1 and L2 calculated by the first loss calculation means into the expressions (8) that are simultaneous equations obtained from expressions that express the losses L1 and L2, the transmission loss L01 of the basic mode, and the transmission loss L11 of the first higher-order mode by using efficiencies of coupling between the modes at the connection point.

In a case in which the second optical pulse test method shown in FIG. 2 is performed, the optical pulse test device 101 includes second input means, second measurement means, second loss calculation means, and second computation means.

The second input means inputs a test optical pulse in the first higher-order mode from one end of the optical fiber 10 under test, the test optical pulse having such a wavelength that the test optical pulse can propagate through the optical fiber 10 under test in the basic mode and the first higher-order mode.

The second measurement means receives return light that is generated by the test optical pulse input by the second input means, and measures intensity distributions relative to the distance from the one end with respect to a basic mode component and a first higher-order mode component of the return light.

The second loss calculation means calculates a loss L3 of the basic mode component and a loss L4 of the first higher-order mode component of the return light at a connection point at which the optical fibers of the same type constituting the optical fiber 10 under test are connected in series, from the intensity distributions measured by the second measurement means.

The second computation means computes a transmission loss L01 of the basic mode at the connection point and a transmission loss L11 of the first higher-order mode at the connection point by substituting the losses L3 and L4 calculated by the second loss calculation means into the expressions (9) that are simultaneous equations obtained from expressions that express the losses L3 and L4, the transmission loss L01 of the basic mode, and the transmission loss L11 of the first higher-order mode by using efficiencies of coupling between the modes at the connection point.

The first input means and the second input means are constituted by:

a generation unit A that generates a test optical pulse having such a wavelength that the test optical pulse can propagate through the optical fiber 10 under test in the basic mode and the first higher-order mode; and a mode multiplexing/demultiplexing unit B that inputs the test optical pulse generated by the generation unit A to the optical fiber 10 under test in the basic mode or the first higher-order mode and separates return light of the test optical pulse into the basic mode and the first higher-order mode.

The first measurement means and the second measurement means are constituted by:

the mode multiplexing/demultiplexing unit B;

a light receiving unit C that performs photoelectric conversion on mode components of the return light separated by the mode multiplexing/demultiplexing unit B; and an A/D (analog/digital) converter 18 and a signal processing unit 19 in an arithmetic processing unit D, the A/D converter 18 converting signals output from the light receiving unit C into digital data, the signal processing unit 19 acquiring intensity distributions of the mode components of the return light relative to the distance from the one end of the optical fiber 10 under test based on the digital data.

The first loss calculation means and the second loss calculation means are constituted by a loss calculation unit 20 in the arithmetic processing unit D, the loss calculation unit 20 calculating losses that occur at a connection point from the intensity distributions of the mode components of the return light.

The first computation means and the second computation means are constituted by a transmission loss calculation unit 21 in the arithmetic processing unit D, the transmission loss calculation unit 21 calculating transmission losses of the respective modes from the losses calculated by the loss calculation unit 20.

The generation unit A includes a light source 11, a pulse generator 12, and a light intensity modulator 13. The light source 11 can output continuous light having such a wavelength that the continuous light can propagate through the optical fiber 10 under test in the basic mode and the first higher-order mode, and the output continuous light is pulsed by the light intensity modulator 13 according to a signal output from the pulse generator 12 to generate a test optical pulse. The light intensity modulator 13 is an acousto-optic modulator that includes an acousto-optic switch configured to perform pulse driving of an acousto-optic element, for example. Note that the pulse generator 12 may also output, to the arithmetic processing unit D, a trigger signal to determine a timing at which measurement of backscattered light intensity distributions is started.

The mode multiplexing/demultiplexing unit B includes an optical circulator 14 and a mode multiplexer/demultiplexer 15. The test optical pulse generated by the light intensity modulator 13 is input to the mode multiplexer/demultiplexer 15 via the optical circulator 14. The mode multiplexer/demultiplexer 15 is a mode multiplexer/demultiplexer that includes a directional coupler that is constituted by a planar light wave circuit as that described in NPL 2, for example. The test optical pulse is input in the basic mode or the first higher-order mode from the mode multiplexer/demultiplexer 15 to one end of the optical fiber 10 under test.

When the test optical pulse input in the basic mode or the first higher-order mode propagates through the optical fiber 10 under test, a portion of the test optical pulse couples with the basic mode and the first higher-order mode propagating in the opposite direction due to Rayleigh scattering, and backscattered light of the basic mode and the first higher-order mode is generated. The backscattered light is again input as return light to the mode multiplexer/demultiplexer 15. At this time, a basic mode component and a first higher-order mode component of the return light are separated by the mode multiplexer/demultiplexer 15.

The light receiving unit C includes two light receivers (16 and 17). The basic mode component of the return light separated by the mode multiplexer/demultiplexer 15 is input to the light receiver 16 via the optical circulator 14, the first higher-order mode component of the return light is input to the light receiver 17, and photoelectric conversion is performed on these mode components.

The arithmetic processing unit D includes the A/D converter 18, the signal processing unit 19, the loss calculation unit 20, and the transmission loss calculation unit 21. Electrical signals output from the light receivers 16 and 17 are converted to digital data by the A/D converter 18. The digital data is input to the signal processing unit 19.

The signal processing unit 19 acquires intensity distributions of the basic mode component and the first higher-order mode component of the return light. Furthermore, the loss calculation unit 20 acquires losses that occur in the intensity distributions of the basic mode component and the first higher-order mode component at a connection point. Then, the transmission loss calculation unit 21 performs arithmetic processing of calculating transmission losses of the respective modes at the connection point.

Note that the arithmetic processing unit D can also be realized using a computer and a program, and the program can be recorded in a recording medium or provided via a network.

The following describes the arithmetic processing of calculating the transmission losses of the basic mode and the first higher-order mode at the connection point.

When the test optical pulse is input in the basic mode to the optical fiber under test, losses that occur at the connection point in backscattered light intensity of the basic mode component and backscattered light intensity of the first higher-order mode component can be expressed using the following expressions.

$$L_1 = 10 \log[(\eta_{01\text{-}01} + \eta_{01\text{-}11})(\eta_{01\text{-}01} + \eta_{11\text{-}01})] \quad (1)$$

$$L_2 = 10 \log[(\eta_{01\text{-}01} + \eta_{01\text{-}11})(\eta_{01\text{-}11} + \eta_{11\text{-}11})] \quad (2)$$

L1 and L2 respectively represent losses occurring at the connection point in the backscattered light intensity of the basic mode component and the backscattered light intensity of the first higher-order mode component, which are expressed in decibels. $\eta_{01\text{-}01}$ represents an efficiency of coupling from the basic mode to the basic mode at the connection point. $\eta_{01\text{-}11}$ represents an efficiency of coupling from the basic mode to the first higher-order mode at the connection point. $\eta_{11\text{-}01}$ represents an efficiency of coupling from the first higher-order mode to the basic mode at the connection point. $\eta_{11\text{-}11}$ represents an efficiency of coupling from the first higher-order mode to the first higher-order mode at the connection point.

Here, the following equation holds for $\eta_{01\text{-}11}$ and $\eta_{11\text{-}01}$ due to symmetry.

$$\eta_{01\text{-}11} = \eta_{11\text{-}01} \quad (3)$$

Also, when the test optical pulse is input in the first higher-order mode to the optical fiber under test, losses that occur at the connection point in backscattered light intensity of the basic mode component and backscattered light intensity of the first higher-order mode component can be expressed using the following expressions.

$$L_3 = 10 \log[(\eta_{11\text{-}11} + \eta_{11\text{-}01})(\eta_{01\text{-}01} + \eta_{11\text{-}01})] \quad (4)$$

$$L_4 = 10 \log[(\eta_{11\text{-}11} + \eta_{11\text{-}01})(\eta_{11\text{-}11} + \eta_{01\text{-}11})] \quad (5)$$

L3 and L4 respectively represent losses occurring at the connection point in the backscattered light intensity of the basic mode component and the backscattered light intensity of the first higher-order mode component, which are expressed in decibels.

FIG. 3(A) shows an example of measurement of backscattered waveforms when the test optical pulse is input in the basic mode and shows a relationship between L1 and L2. FIG. 3(B) shows an example of measurement of backscattered waveforms when the test optical pulse is input in the first higher-order mode and shows a relationship between L3 and L4.

On the other hand, transmission losses that occur when the basic mode or the first higher-order mode is input to the optical fiber under test can be expressed using the following expressions.

$$L_{01} = 10 \log(\eta_{01\text{-}01} + \eta_{01\text{-}11}) \quad (6)$$

$$L_{11} = 10 \log(\eta_{11\text{-}11} + \eta_{11\text{-}01}) \quad (7)$$

L01 and L11 respectively represent transmission losses of the basic mode and the first higher-order mode at the connection point, which are expressed in decibels.

The following expressions are obtained from the expressions (1) to (3), (6), and (7).

$$L_{01} = \frac{L_1}{2} \quad (8)$$

$$L_{11} = L_2 - \frac{L_1}{2}$$

Accordingly, the transmission losses of the basic mode and the first higher-order mode at the connection point can be calculated from the measured L1 and L2 by using the expressions (8). Also, the following expressions are obtained from the expressions (3) to (7).

$$L_{11} = \frac{L_4}{2} \qquad (9)$$
$$L_{01} = L_3 - \frac{L_4}{2}$$

Accordingly, the transmission losses of the basic mode and the first higher-order mode at the connection point can be calculated from the measured L3 and L4 by using the expressions (9).

Other Embodiments

The present invention is not limited to the above-described embodiment, and can be implemented with various modifications made within a scope not departing from the gist of the present invention.

That is, the present invention is not limited to the above-described embodiment as is, and when the present invention is implemented, constitutional elements can be modified within a scope not departing from the gist of the present invention. For example, the arithmetic processing unit D can also be realized using a computer and a program, and the program can be recorded in a recording medium or provided via a network.

Also, the optical fiber under test described in the above embodiment is obtained by connecting two optical fibers of the same type in series, but an optical fiber that is obtained by connecting three or more optical fibers of the same type or optical fibers of different types in series can also be tested. However, it should be noted that measurement accuracy decreases as the connection point gets farther from the end to which test light is input.

Also, various inventions can be made by appropriately combining a plurality of constitutional elements disclosed in the above-described embodiment. For example, some constitutional elements may also be omitted from all the constitutional elements described in the embodiment. Furthermore, constitutional elements of different embodiments may also be appropriately combined.

REFERENCE SIGNS LIST

10 Optical fiber under test
11 Light source
12 Pulse generator
13 Light intensity modulator
14 Optical circulator
15 Mode multiplexer/demultiplexer
16, 17 Light receiver
18 A/D converter
19 Signal processing unit
20 Loss calculation unit
21 Transmission loss calculation unit
101 Optical pulse test device

The invention claimed is:

1. An optical pulse test method comprising: a first input procedure of inputting a test optical pulse in a basic mode from one end of an optical fiber under test that is obtained by connecting optical fibers of the same type in series, the test optical pulse having such a wavelength that the test optical pulse can propagate through the optical fiber under test in the basic mode and a first higher-order mode; a first measurement procedure of receiving return light that is generated by the test optical pulse input in the first input procedure and measuring intensity distributions of a basic mode component and a first higher-order mode component of the return light relative to the distance from the one end; a first loss calculation procedure of calculating a loss L1 of the basic mode component and a loss L2 of the first higher-order mode component of the return light at a connection point at which the optical fibers of the same type constituting the optical fiber under test are connected in series, from the intensity distributions measured in the first measurement procedure; and a first computation procedure of computing a transmission loss L01 of the basic mode at the connection point and a transmission loss L11 of the first higher-order mode at the connection point by substituting the losses L1 and L2 calculated in the first loss calculation procedure into first expressions that are simultaneous equations obtained from expressions that express the losses L1 and L2, the transmission loss L01 of the basic mode, and the transmission loss L11 of the first higher-order mode by using efficiencies of coupling between the modes at the connection point.

2. An optical pulse test method comprising: a second input procedure of inputting a test optical pulse in a first higher-order mode from one end of an optical fiber under test that is obtained by connecting optical fibers of the same type in series, the test optical pulse having such a wavelength that the test optical pulse can propagate through the optical fiber under test in a basic mode and the first higher-order mode; a second measurement procedure of receiving return light that is generated by the test optical pulse input in the second input procedure and measuring intensity distributions of a basic mode component and a first higher-order mode component of the return light relative to the distance from the one end; a second loss calculation procedure of calculating a loss L3 of the basic mode component and a loss L4 of the first higher-order mode component of the return light at a connection point at which the optical fibers of the same type constituting the optical fiber under test are connected in series, from the intensity distributions measured in the second measurement procedure; and a second computation procedure of computing a transmission loss L01 of the basic mode at the connection point and a transmission loss L11 of the first higher-order mode at the connection point by substituting the losses L3 and L4 calculated in the second loss calculation procedure into second expressions that are simultaneous equations obtained from expressions that express the losses L3 and L4, the transmission loss L01 of the basic mode, and the transmission loss L11 of the first higher-order mode by using efficiencies of coupling between the modes at the connection point.

3. The optical pulse test method according to claim 1, wherein the losses L1 and L2, the transmission loss L01 of the basic mode at the connection point, and the transmission loss L11 of the first higher-order mode at the connection point are expressed in decibels, and expressions (C1) are used as the first expressions $$L_{01} = \frac{L_1}{2} \qquad (C1)$$
$$L_{11} = L_2 - \frac{L_1}{2}.$$

4. The optical pulse test method according to claim 2, wherein the losses L3 and L4, the transmission loss L01 of the basic mode, and the transmission loss L11 of the first higher-order mode are expressed in decibels, and expressions (C2) are used as the second expressions $$L_{11} = \frac{L_4}{2}$$
$$L_{01} = L_3 - \frac{L_4}{2}.$$
(C2)

5. An optical pulse test device comprising: first input means for inputting a test optical pulse in a basic mode from one end of an optical fiber under test that is obtained by connecting optical fibers of the same type in series, the test optical pulse having such a wavelength that the test optical pulse can propagate through the optical fiber under test in the basic mode and a first higher-order mode; first measurement means for receiving return light that is generated by the test optical pulse input by the first input means and measuring intensity distributions of a basic mode component and a first higher-order mode component of the return light relative to the distance from the one end; first loss calculation means for calculating a loss L1 of the basic mode component and a loss L2 of the first higher-order mode component of the return light at a connection point at which the optical fibers of the same type constituting the optical fiber under test are connected in series, from the intensity distributions measured by the first measurement means; and first computation means for computing a transmission loss L01 of the basic mode at the connection point and a transmission loss L11 of the first higher-order mode at the connection point by substituting the losses L1 and L2 calculated by the first loss calculation means into first expressions that are simultaneous equations obtained from expressions that express the losses L1 and L2, the transmission loss L01 of the basic mode, and the transmission loss L11 of the first higher-order mode by using efficiencies of coupling between the modes at the connection point.

6. The optical pulse test device according to claim 5, wherein the losses L1 and L2, the transmission loss L01 of the basic mode at the connection point, and the transmission loss L11 of the first higher-order mode at the connection point are expressed in decibels, and expressions (C1) are used as the first expressions $$L_{01} = \frac{L_1}{2}$$
$$L_{11} = L_2 - \frac{L_1}{2}.$$
(C1)

* * * * *